US010803860B2

(12) United States Patent
Bharadwaj

(10) Patent No.: US 10,803,860 B2
(45) Date of Patent: Oct. 13, 2020

(54) DEPENDENCY GRAPH CONVERSATION MODELING FOR USE IN CONDUCTING HUMAN-TO-COMPUTER DIALOG SESSIONS WITH A COMPUTER-IMPLEMENTED AUTOMATED ASSISTANT

(71) Applicant: Google LLC, Mountain View, CA (US)

(72) Inventor: Amit Bharadwaj, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 345 days.

(21) Appl. No.: 15/772,998

(22) PCT Filed: May 1, 2018

(86) PCT No.: PCT/US2018/030451
§ 371 (c)(1),
(2) Date: May 2, 2018

(87) PCT Pub. No.: WO2019/203859
PCT Pub. Date: Oct. 24, 2019

(65) Prior Publication Data
US 2020/0258509 A1 Aug. 13, 2020

Related U.S. Application Data

(60) Provisional application No. 62/660,129, filed on Apr. 19, 2018.

(51) Int. Cl.
*G06F 13/00* (2006.01)
*G06F 16/00* (2019.01)
(Continued)

(52) U.S. Cl.
CPC .......... *G10L 15/22* (2013.01); *G06F 16/9535* (2019.01); *G10L 15/19* (2013.01); *H04L 51/02* (2013.01)

(58) Field of Classification Search
CPC ................................. G06F 13/00; G06F 16/00
See application file for complete search history.

(56) References Cited

U.S. PATENT DOCUMENTS

2006/0150188 A1* 7/2006 Roman ................ G06F 9/4887
718/104
2011/0219361 A1* 9/2011 Dolby .......................... 717/136
(Continued)

OTHER PUBLICATIONS

European Patent Office; International Search Report and Written Opinion of PCT Ser. No. PCT/US2018/030451; 15 pages; dated Jul. 11, 2018.

*Primary Examiner* — Shreyans A Patel
(74) *Attorney, Agent, or Firm* — Middleton Reutlinger

(57) ABSTRACT

Conversations are modeled using dependency graph data structures to facilitate the interaction of users with automated assistants when performing actions performed by computing services. An automated assistant may utilize a dependency graph data structure to guide or otherwise control a human-to-computer dialog session with a user, e.g., by generating one or more outputs or prompts that are presented to the user on a computing device operated by that user, and may thereby enable efficient use of technical hardware.

21 Claims, 14 Drawing Sheets

(51) Int. Cl.
*G10L 15/22* (2006.01)
*G10L 15/19* (2013.01)
*G06F 16/9535* (2019.01)
*H04L 12/58* (2006.01)

(56) References Cited

U.S. PATENT DOCUMENTS

| | | | |
|---|---|---|---|
| 2013/0267319 | A1 | 10/2013 | Kuhn et al. |
| 2013/0275164 | A1* | 10/2013 | Gruber .................. G06Q 10/02 |
| | | | 705/5 |
| 2017/0116982 | A1 | 4/2017 | Gelfenbeyn et al. |
| 2017/0295117 | A1* | 10/2017 | Pfriem ................. G06Q 10/107 |
| 2017/0300831 | A1* | 10/2017 | Gelfenbeyn ............ G10L 15/30 |
| 2018/0033017 | A1* | 2/2018 | Gopalakrishnan Iyer ................... |
| | | | G06F 40/30 |
| 2018/0239507 | A1* | 8/2018 | Bui ........................ G06Q 10/10 |
| 2018/0322380 | A1* | 11/2018 | Aggarwal ............. G06N 20/00 |

* cited by examiner

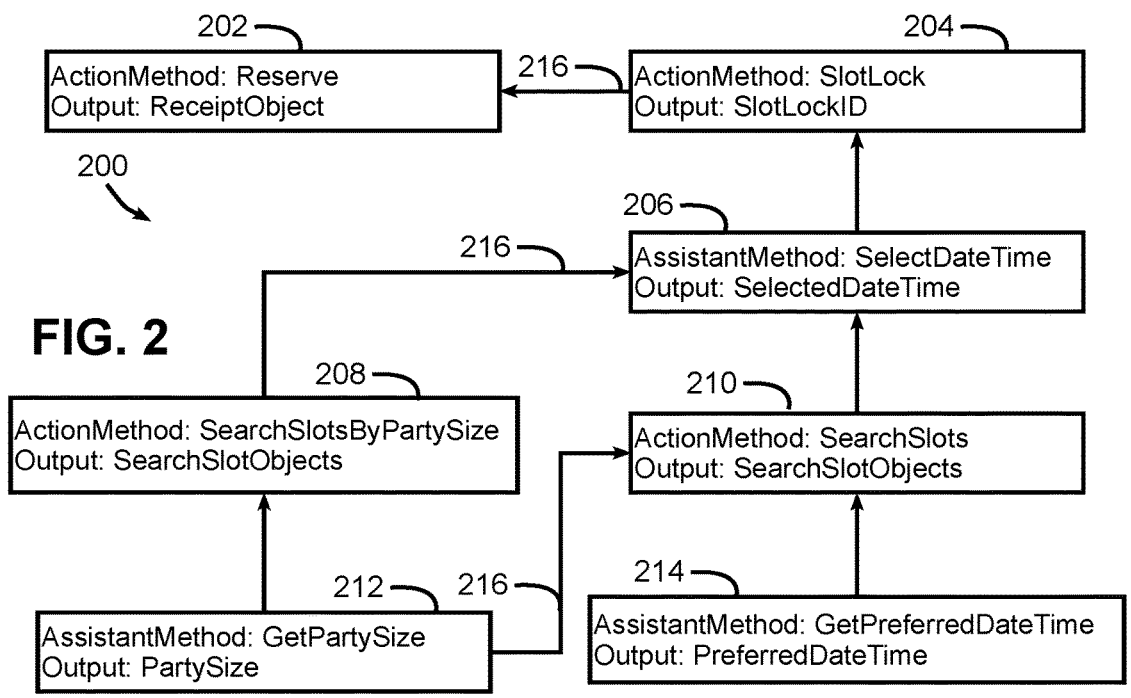

FIG. 2

```
action_method {
  name: "Reserve"
  description: "Reserves a table and returns a receipt with confirmation number"
  indexable: true
  produces {
    name: "ReceiptObject"
  }
  http_agent {
    url: "api.exampleagent.com"
    method: POST
    param {
      key: "firstname"
      value_annotation {
        type: ASSISTANT_EXPRESSION
        produced_from: "Assistant.User.FirstName"
      }
    }
    param {
      key: "datetime"
      value_annotation {
        type: NAMED_REFERENCE
        produced_from: "SelectedDateTime"
      }
    }
    param {
      key: "partysize"
      value_annotation {
        type: NAMED_REFERENCE
        produced_from: "PartySize"
      }
    }
    ○ ○ ○
  }
}
```

FIG. 3A

```
action_method {
  name: "SlotLock"
  produces {
    name: "SlotLockID"
  }
  http_agent {
    url: "api.exampleagent.com"
    param {
      key: "sdt"
      value_annotation {
        type: NAMED_REFERENCE
        produced_from: "SelectedDateTime"
      }
    }
  }
}
```
222

FIG. 3B

```
action_method {
  name: "Search Available Slots"
  produces {
    name: "SearchSlotObjects"
  }
  http_agent {
    url: "api.exampleagent.com"
    param {
      key: "pdt"
      value_annotation {
        type: NAMED_REFERENCE
        produced_from: "PreferredDateTime"
      }
    }
    param {
      key: "partysize"
      value_annotation {
        type: NAMED_REFERENCE
        produced_from: "PartySize"
      }
    }
  }
}
```
224

FIG. 3C

```
action_method {
  name: "Search Available Slots by Party Size"
  produces {
    name: "SearchSlotObjects"
  }
  http_agent {
    url: "api.exampleagent.com"
    param {
      key: "partysize"
      value_annotation {
        type: NAMED_REFERENCE
        produced_from: "PartySize"
      }
    }
  }
}
```

```
assistant_method {
  name: "SelectDateTime"
  produces {
    name: "SelectedDateTime"
  }
  user_input {
    select_input {
      prompt: "Select a time"
      produced_datalist {
        annotation {
          produced_from: "SearchSlotObjects"
          operation: "@produced.TimeSlots"
        }
      }
    }
  }
}
```

```
assistant_method {
  name: "GetPartySize"
  produces {
    name: "PartySize"
  }
  user_input {
    text_input {
      prompt: "How many people"
    }
  }
}
```

```
assistant_method {
  name: "GetPreferredDateTime"
  produces {
    name: "PreferredDateTime"
  }
  user_input {
    text_input {
      prompt: "What day and time are you looking for"
    }
  }
}
```

```
action_method {
  name: "BuyTicket"
  description: "Buy tickets for events"
  indexable: true
  produces {
    # This is the final receipt of ticketing.
    name: "TicketObject"
  }
  http_agent {
    url: "api.exampleagent.com"
    method: POST
    param {
      key: "authToken"
      value_annotation {
        type: ASSISTANT_EXPRESSION
        produced_from: "Assistant.User.AuthToken"
      }
    }
    param {
      key: "sku"
      value_annotation {
        type: NAMED_REFERENCE
        produced_from: "TicketSku"
      }
    }
    param {
      key: "numTickets"
      value_annotation {
        type: NAMED_REFERENCE
        produced_from: "NumTickets"
      }
    }
  }
}
```
280

FIG. 5A

```
action_method {
  name: "GetTicketSku"
  produces {
    name: "TicketSku"
  }
  http_agent {
    url: "api.exampleagent.com"
    param {
      key: "eventId"
      value_annotation {
        type: NAMED_REFERENCE
        produced_from: "SelectedEventId"
      }
    }
    param {
      key: "ticketType"
      value_annotation {
        type: NAMED_REFERENCE
        produced_from: "SelectedTicketType"
      }
    }
  }
}
```
282

FIG. 5B

```
action_method {
  name: "GetAvailableTicketTypes"
  produces {
    name: "TicketTypeObjects"
  }
  http_agent {
    url: "api.exampleagent.com"
    param {
      key: "eventId"
      value_annotation {
        type: NAMED_REFERENCE
        produced_from: "SelectedEventId"
      }
    }
  }
}
```

FIG. 5C

```
action_method {
  name: "SearchEvents"
  produces {
    name: "EventObjects"
  }
  http_agent {
    url: "api.exampleagent.com"
    param {
      key: "keyword"
      value_annotation {
        type: NAMED_REFERENCE
        produced_from: "SearchKeyword"
      }
    }
    param {
      key: "pdt"
      value_annotation {
        type: NAMED_REFERENCE
        produced_from: "Date"
      }
    }
  }
}
```

FIG. 5D

```
assistant_method {
  name: "SelectTicketType"
  produces {
    name: "SelectedTicketType"
  }
  user_input {
    select_input {
      prompt: "Select a ticket type: "
      produced_datalist {
        annotation {
          produced_from: "TicketTypeObjects"
        }
      }
    }
  }
}
```

FIG. 5E

```
assistant_method {
  name: "GetNumTickets"
  produces {
    name: "NumTickets"
  }
  user_input {
    text_input {
      prompt: "How many people: "
    }
  }
}
```
— 290

FIG. 5F

```
assistant_method {
  name: "SelectEvent"
  produces {
    name: "SelectedEventId"
  }
  user_input {
    select_input {
      prompt: "Select an event: "
      produced_datalist {
        annotation {
          produced_from: "EventObjects"
        }
      }
    }
  }
}
```
— 292

FIG. 5G

```
assistant_method {
  name: "GetPreferredDate"
  produces {
    name: "Date"
  }
  user_input {
    text_input {
      prompt: "Enter preferred date time: "
    }
  }
}
```
— 294

FIG. 5H

```
assistant_method {
  name: "GetKeyword"
  produces {
    name: "SearchKeyword"
  }
  user_input {
    text_input {
      prompt: "Enter search keyword: "
    }
  }
}
```
— 296

FIG. 5I

DEPENDENCY GRAPH CONVERSATION MODELING FOR USE IN CONDUCTING HUMAN-TO-COMPUTER DIALOG SESSIONS WITH A COMPUTER-IMPLEMENTED AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans—which when they interact with automated assistants may be referred to as "users"—may provide commands, queries, and/or requests using free-form natural language input. Free-form natural language may include vocal utterances converted into text using speech recognition and/or typed free-form natural language input.

Automated assistants enable users to obtain information, access services, and/or perform various tasks. For example, users are able to execute searches, get directions, and in some cases, interact with third party computing services. These third party computing service interactions, access to which may be facilitated using application programming interfaces ("APIs") provided by automated assistants and/or the third party computing services, allow users to perform a variety of actions, such as calling cars from ride-sharing applications, ordering goods or services (e.g., pizza), making reservations, and so forth.

Automated assistants converse with users using voice recognition and natural language processing, with some also utilizing machine learning and other artificial intelligence technologies, for instance, to predict user intents. Automated assistants may be adept at holding conversations with users in natural, intuitive ways, in part because they understand dialog context. To utilize dialog context, an automated assistant may preserve recent inputs from the user, questions that came from the user, and/or responses/questions provided by the automated assistant. For example, the user might ask, "Where is the closest coffee shop?", to which the automated assistant might reply, "Two blocks east." The user might then ask, "How late is it open?" By preserving at least some form of dialog context, the automated assistant is able to determine that the pronoun "it" refers to "coffee shop" (i.e., co-reference resolution).

However, with conventional automated assistants, particularly with respect to actions associated with third party and other computing services that require a number of input parameters in order to be performed effectively, modeling the conversations to collect the required input parameters can be complicated and labor intensive, and may necessitate substantial development overhead associated with handling all possible inputs and combinations and orderings thereof. Such complicated models can occupy a relatively large amount of space in computer memory and may also require updating over time to handle previously unforeseen inputs and combinations and orderings thereof. Conversations may also be constrained and inflexible to varying user inputs, resulting in a more robotic and less realistic interaction with an automated assistant.

SUMMARY

Techniques are described herein for modelling conversations using dependency graph data structures to facilitate the interaction of users with automated assistants when performing actions performed by computing services. An automated assistant in some implementations may utilize a dependency graph data structure to guide or otherwise control a human-to-computer dialog session with a user, e.g., by generating one or more outputs or prompts that are presented to the user on a computing device operated by that user.

As will be explained in more detail below, the concepts described herein may enable an automated assistant to obtain selected, required information in an efficient manner and, in doing so, the concepts may allow the automated assistant to operate in an effective manner whilst also making efficient use of hardware resources on a user computing device (e.g. a client computing device). For example, the concepts described herein may allow the automated assistant to make most efficient use of microphone and/or speaker hardware on a user computing device so that power consumption on the device may be reduced.

Therefore, consistent with one aspect of the invention, a method implemented using one or more processors may include determining an action to be performed by a computing service for a user of a computing device in communication with an automated assistant implemented at least in part by the one or more processors, and with the automated assistant, causing the computing service to perform the action for the user of the computing device by accessing a dependency graph data structure for the action, the dependency graph data structure including a plurality of nodes and a plurality of directed edges, each node identifying an action method that accesses the computing service or an assistant method that collects one or more parameters for use in performing the action, and each directed edge connecting a respective pair of nodes from among the plurality of nodes and identifying at least one parameter generated by the action method or assistant method identified by one node among the respective pair of nodes and utilized by the action method or assistant method identified by the other node among the respective pair of nodes, conducting a human-to-computer dialog session between the user and the automated assistant to determine one or more parameters used to perform the action, including generating one or more natural language outputs for presentation by the computing device operated by the user using the dependency graph data structure and receiving one or more instances of free-form natural language input that are received at one or more input components of the computing device operated by the user, and initiating performance of the action by the computing service using the determined one or more parameters.

In some implementations, a first node among the plurality of nodes in the dependency graph data structure identifies a first action method that calls the computing service, and initiating performance of the action by the computing service includes executing the first action method. Also, in some implementations, the first action method includes a call operation including a plurality of inputs, and executing the first action method includes executing the call operation using the determined one or more parameters as inputs among the plurality of inputs for the call operation.

Further, in some implementations, the dependency graph data structure includes a specification that defines methods and dependencies therebetween, and the first action method is marked as indexable in the specification to indicate that the first action method calls the computing service to perform the action. In some implementations, the first action method calls the computing service to perform the action, and a second node among the plurality of nodes in the dependency graph data structure identifies a second action method that calls the computing service to obtain intermediate data for use in performing the action.

In addition, in some implementations, a first node among the plurality of nodes in the dependency graph data structure identifies a first assistant method that includes a first prompt that requests a first parameter, and generating the one or more natural language outputs includes executing the first assistant method to generate a first natural language output including the first prompt. In some implementations, determining the action to be performed by the computing service is performed by the automated assistant and is based upon an initial natural language input received at the computing device of the user and specifying a first parameter identified by a first directed edge in the dependency graph data structure, the first directed edge connects a first node that identifies a first assistant method that generates the first parameter and a second node that identifies a first action method that utilizes the first parameter, and conducting the human-to-computer dialog session between the user and the automated assistant includes bypassing generation of a natural language output to request the first parameter in response to determining that the first parameter is specified in the initial natural language input.

In addition, in some implementations, a first parameter identified by a first directed edge in the dependency graph data structure connects a first node that identifies a first assistant method that generates the first parameter and a second node that identifies a first action method that utilizes the first parameter, and conducting the human-to-computer dialog session between the user and the automated assistant includes bypassing generation of a natural language output to request the first parameter in response to determining that the first parameter is determinable without requesting the first parameter from the user. Moreover, in some implementations, determining that the first parameter is determinable without requesting the first parameter from the user includes determining that the first parameter is determinable from stored data associated with the user.

In some implementations, conducting the human-to-computer dialog session between the user and the automated assistant to determine the one or more parameters used to perform the action includes ordering the one or more generated natural language outputs using the dependency graph data structure. Some implementations may also include invalidating one or more of the determined one or more parameters during the human-to-computer dialog session in response to receiving a first instance of free-form natural language input among the one or more instances of free-form natural language input, accessing the dependency graph data structure to identify one or more action methods or assistant methods identified in the dependency graph data structure to re-execute in order to update the one or more invalidated parameters, and re-executing the one or more identified action methods or assistant methods to update the one or more invalidated parameters.

Moreover, in some implementations, invalidating the one or more parameters maintains one or more other parameters as valid such that re-execution of one or more action methods or assistant methods used to determine the one or more other parameters is bypassed when re-executing the one or more identified action methods or assistant methods. In some implementations, determining the action is performed by the automated assistant and includes selecting the action from among a plurality of actions using the dependency graph data structure. In addition, in some implementations, the computing service is a third party computing service, and initiating performance of the action by the computing service using the determined one or more parameters includes calling the third party computing service using the determined one or more parameters.

In some implementations, the computing service is a cloud computing service, and in some implementations, the computing service is resident on the computing device operated by the user. Also, in some implementations, the dependency graph data structure defines a directed acyclic graph. In some implementations, the action creates a reservation, a first node among the plurality of nodes identifies a first action method that calls the computing service to search for available time slots, and a second node among the plurality of nodes identifies a second action method that calls the computing service to reserve an available time slot. In addition, in some implementations, the action obtains a product or a ticket to an event.

Consistent with another aspect of the invention, a method implemented using one or more processors may include receiving through a computer interface a plurality of parameters to be used by an automated assistant to cause a computing service to perform an action for a user of a computing device in communication with the automated assistant, determining a plurality of dependencies between the plurality of parameters, building a dependency graph data structure for the action using the one or more processors, the dependency graph data structure configured for use in conducting a human-to-computer dialog session between the user and the automated assistant to determine one or more parameters used to perform the action, including for generating one or more natural language outputs for presentation by the computing device operated by the user, where building the dependency graph data structure for the action includes building a plurality of nodes for the dependency graph data structure using the received plurality of parameters, including building at least one node identifying an action method that accesses the computing service and building at least one assistant method that collects one or more parameters from among the received plurality of parameters, and building a plurality of directed edges for the dependency graph data structure using the determined plurality of dependencies, each directed edge connecting a respective pair of nodes from among the plurality of nodes and identifying at least one parameter from among the received plurality of parameters that is generated by the action method or assistant method identified by one node among the respective pair of nodes and utilized by the action method or assistant method identified by the other node among the respective pair of nodes, and generating a call operation in the action method that calls the computing service with one or more of the received plurality of parameters to perform the action.

Also, in some implementations, the computing service is a third party computing service, and the call operation is configured to access the third party computing service. In some implementations, determining the plurality of dependencies includes receiving the plurality of dependencies through the computer interface. Further, in some implementations, receiving the plurality of parameters includes receiving a plurality of action call definitions.

In addition, some implementations may include a system including one or more processors and memory operably coupled with the one or more processors, where the memory stores instructions that, in response to execution of the instructions by one or more processors, cause the one or more processors to perform any of the aforementioned methods. Some implementations also include at least one non-transitory computer-readable medium including instructions that, in response to execution of the instructions by one or more processors, cause the one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 is a block diagram of an example dependency graph data structure for modeling a conversation for an example restaurant reservation booking action.

FIGS. 3A-3G illustrate example implementations of action and assistant methods represented in the dependency graph data structure of FIG. 2.

FIG. 4 is a block diagram of an example dependency graph data structure for modeling a conversation for an example event ticket purchasing action.

FIGS. 5A-5I illustrate example implementations of action and assistant methods represented in the dependency graph data structure of FIG. 4.

DETAILED DESCRIPTION

Figure 1:
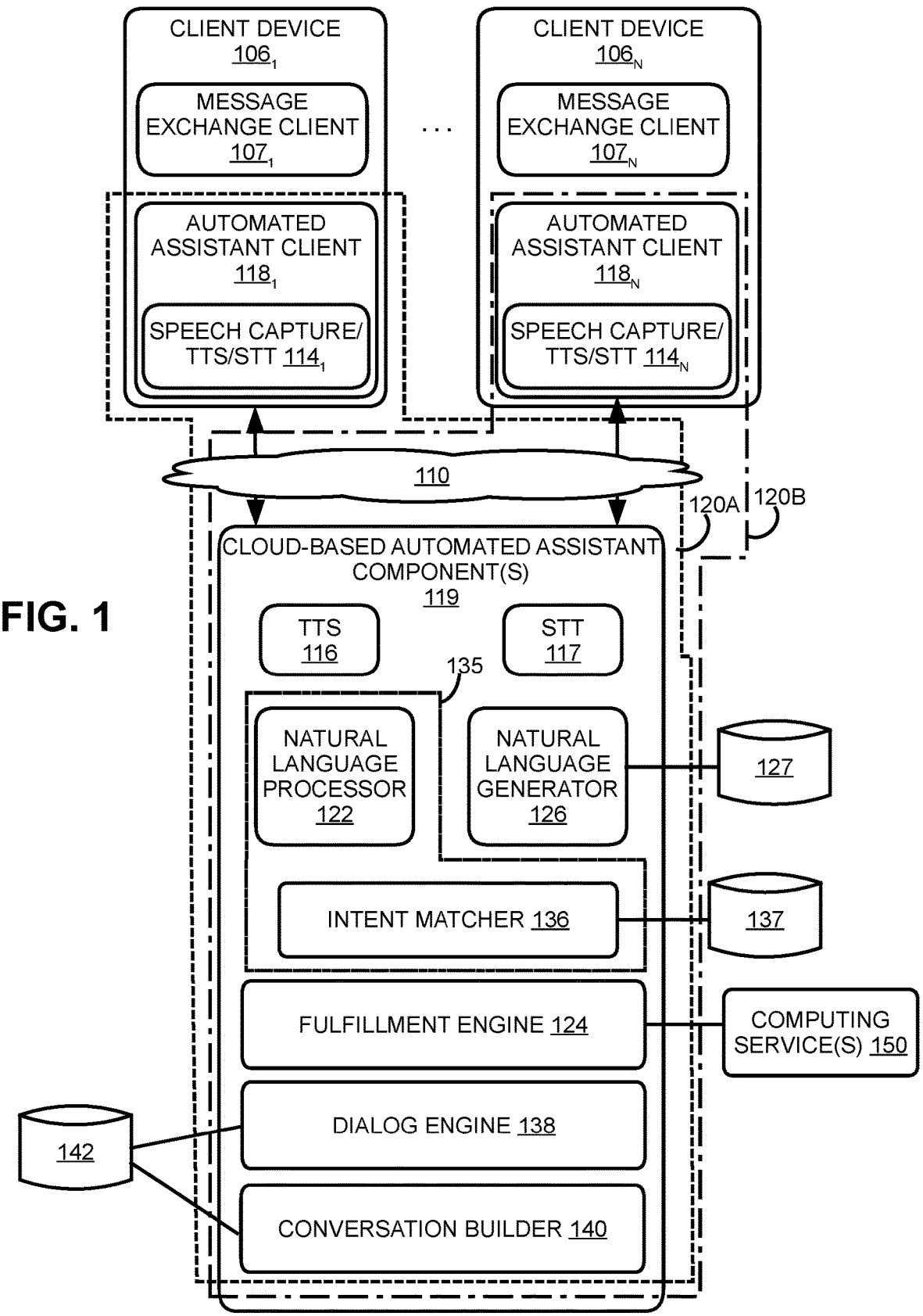
FIG. 1 is a block diagram of an example computing environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language understanding engine 135, may be implemented on one or more computing systems (collectively referred to as a "cloud" computing system) that are communicatively coupled to client devices $106_{1-N}$ via one or more local and/or wide area networks (e.g., the Internet) indicated generally at 110.

In some implementations, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119.

It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, the user can utter commands, searches, etc., and automated assistant 120 may utilize speech recognition to convert the utterances into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network. In various implementations, for example, some or all of the functionality of an automated assistant may be distributed between multiple computer systems, or even to a client computing device. In some implementations, for example, the functionality discussed herein with respect to conducting human-to-dialog dialog sessions using dependency graph data structures and initiating performance of actions may be performed entirely within a client computing device, e.g., so that such functionality is available to a user even when no online connectivity exists.

As noted above, in various implementations, each of the client computing devices $106_{1-N}$ may operate an automated assistant client 118. In various embodiments, each automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118. In various implementations, speech capture/TTS/STT module 114 may generate speech recognition output based on a vocal query.

Each speech capture/TTS/STT module 114 may be configured to perform one or more functions: capture a user's speech, e.g., via a microphone; convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, implemented at one or more remote cloud-based computer servers, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language understanding engine 135, the aforementioned TTS module 116, the aforementioned STT module 117, and other components that are described in more detail below. In some implementations, one or more of the engines and/or modules of automated assistant 120 may be omitted, combined, and/or implemented in a component that is separate from automated assistant 120. In some implementations, to protect privacy, one or more of the components of automated assistant 120, such as natural language understand engine 135, speech capture/TTS/STT module 114, etc., may be implemented at least on part on client devices 106 (e.g., to the exclusion of the cloud).

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via one of the client devices $106_{1-N}$. As used herein, free-form natural language input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, change of input/output ("I/O") modalities employed by the user, and so forth.

Natural language processor 122 of natural language understanding engine 135 processes natural language input generated by users via client devices $106_{1-N}$ and may generate annotated output (e.g., in textual form) for use by one or more other components of automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a morphological engine that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

One or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Natural language understanding engine 135 may also include an intent matcher 136 that is configured to determine, based on the annotated output of natural language processor 122, an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" engine 135.

Intent matcher 136 may use various techniques to determine an intent of the user. In some implementations, intent matcher 136 may have access to one or more databases 137 that include, for instance, a plurality of mappings between grammars and responsive actions (or more generally, intents). Additionally or alternatively, in some implementations, one or more databases 137 may store one or more machine learning models that are trained to generate output indicative of user intent, based on the user's input.

Grammars may be selected, formulated (e.g., by hand), and/or learned over time, e.g., to represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

In contrast to many grammars (which may be created manually), machine learning models may be trained automatically, e.g., using logs of interactions between users and automated assistants. Machine learning models may take various forms, such as neural networks. They may be trained in various ways to predict user intent from user input. For example, in some implementations, training data may be provided that includes individual training examples. Each training example may include, for instance, free form input from a user (e.g., in textual or non-textual form) and may be labeled (e.g., by hand) with an intent. The training example may be applied as input across the machine learning model (e.g., a neural network) to generate output. The output may be compared to the label to determine an error. This error may be used to train the model, e.g., using techniques such as gradient descent (e.g., stochastic, batch, etc.) and/or back propagation to adjust weights associated with hidden layer(s) of the model. Once such a model is trained with a (usually large) number of training examples, it may be used to generate output that predicts intents from unlabeled free-form natural language inputs.

In some implementations, automated assistant 120 may facilitate (or "broker") the performance of actions by computing services 150 on behalf of users. The actions, which are generally a type of intent capable of being identified or determined by intent matcher 136, generally issue requests to computing services, and generally do so in connection with providing one or more parameters to the computing services to instruct such computing services on how to perform the actions.

A computing service, in this regard, may be considered to include practically any type of computer functionality capable of being invoked to perform some activity on behalf of a user. A computing service may be implemented by one or more processors and may be resident on the same computer system as an automated assistant, or may be resident on a different computer system from the computer system hosting an automated assistant. Some computing services may be accessible over a network (e.g., as is the case for cloud-based computing services), while other computing services may be resident on a user's client computing device. Some computing services may also be considered to be third party computing services that are associated with different parties from that of the automated assistant and the user, irrespective of where those computing services are hosted (e.g., on a third party computer system, on an automated assistant computer system, on a user computing device, in a cloud computing system, etc.).

Accordingly, one kind of user intent that may be identified by intent matcher 136 is an action to cause a third party computing service to perform a transaction or other operation on behalf of a user. For example, automated assistant 120 may provide access to an application programming interface ("API") to a third party service such as a travel service. A user may invoke automated assistant 120 and provide a command such as "I'd like to order a vehicle with wheelchair space to the nearest metro station with step-free access". Intent matcher 136 may map this command to a grammar (which may be added to database 137 in some cases by the third party) that triggers automated assistant 120 to engage with the third party travel service via one or more API calls to the travel service. In another example, the automated assistant 120 may provide access to an API to a different third party service, such as a pizza delivery service. A user may invoke automated assistant 120 and provide a command such as "I'd like to order a pizza." Intent matcher 136 may map this command to a grammar (which may be added to database 137 in some cases by the third party) that triggers automated assistant 120 to engage with the third party pizza delivery service via one or more API calls to the pizza delivery service. As will become more apparent below, in some implementations the third party service, such as the travel service or the pizza delivery service, may build a conversation for enabling an order, such as for ordering a suitable vehicle or for ordering a pizza to be delivered, using a dependency graph data structure that is created by the third party service or otherwise generated based upon user input provided by the third party service. The dependency graph data structure may provide a set of input parameters that need to be filled in order to fulfill, for example, an order for a suitable vehicle or a pizza delivery order. Automated assistant 120 may generate and provide to the user (via client device 106) natural language output that solicits input for any parameters that cannot be obtained from user data and/or input provided in connection with specifying an intent to the automated assistant. Automated assistant 120 may, in this manner, be configured to solicit input only for parameters that cannot be obtained from user data and/or input provided in connection with specifying an intent to the automated assistant. This allows the automated assistant 120 to efficiently identify and obtain selected missing information. In doing so, the automated assistant 120 makes efficient use of hardware resources, including for example the microphone resources and the speaker resources, on the client computing device. Power consumption at the device may be reduced in the process.

In particular, for soliciting input of parameters that cannot be obtained from user data and/or input provided in connection with specifying an intent to the automated assistant, a fulfillment engine 124 may be configured to receive the intent output by intent matcher 136, as well as any associated parameters (whether provided by the user proactively or solicited from the user) and fulfill the intent. In various embodiments, fulfillment of the user's intent may cause various fulfillment information to be generated/obtained. As will be described below, the fulfillment information may in some implementations be provided to a natural language generator ("NLG") 126, which may generate natural language output based on the fulfillment information.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 136, as being a search query. The intent and content of the search query may be provided to one or more search engines to search corpuses of documents and/or other data sources (e.g., knowledge graphs, etc.) for responsive information. Fulfillment engine 124 may provide data indicative of the search query (e.g., the text of the query, a reduced dimensionality embedding, etc.) to a search engine, which may in turn provide responsive information, such as GPS coordinates, or other more explicit information, such as "Timberline Lodge, Mt. Hood, Oreg." This responsive information may form part of the fulfillment information generated by fulfillment engine 124.

Additionally or alternatively, fulfillment engine 124 may be configured to receive, e.g., from natural language understanding engine 135, a user's intent and in turn utilize a dialog engine 138 to conduct a human-to-computer dialog session with the user to perform an action associated with the intent, e.g., by calling or invoking the performance of one or more operations by a computing service 150. Responsive actions may include, for instance, ordering a good/ service, purchasing an event ticket, booking a reservation to a restaurant, hotel, airplane, train, ordering a taxi or rideshare care, starting a timer, setting a reminder, initiating a phone call, playing media, sending a message, etc. In some such implementations, fulfillment information may include parameters associated with the action, confirmation responses (which may be selected from predetermined responses in some cases), etc.

As noted above, natural language generator 126 may be configured to generate and/or select natural language output (e.g., spoken words/phrases that are designed to mimic human speech) based on data obtained from various sources. In some implementations, natural language generator 126 may be configured to receive, as input, fulfillment information associated with fulfillment of an intent by fulfillment engine 124, and to generate natural language output based on the fulfillment information. Additionally or alternatively, natural language generator 126 may receive information from other sources, such as third party computing services, and as will become more apparent below, from a dependency graph data structure, which it may use to formulate natural language output for the user.

A dialog engine 138 may be used to manage the conduct of a conversation associated with an action, and may use a dependency graph data structure associated with a particular action to control the interaction between a user and an automated assistant. As such, dialog engine 138 may store various dependency graph data structures associated with different actions or intents, e.g., with a database 142, and access those dependency graph data structures when interacting with users.

In addition, a conversation builder component 140 may also be supported to generate, modify, update, or otherwise manage dependency graph data structures in some implementations. For example, conversation builder component 140 may provide a web-based user interface in some implementations to enable internal and/or third party developers to create dependency graph data structures for particular actions and store those data structures in database 142 for later access by dialog engine 138.

Various components of FIG. 1, such as dialog engine 138 and conversation builder component 140, may be configured to perform selected aspects of the present disclosure for utilizing and/or generating dependency graph data structures for use in conducting human-to-computer dialog sessions with users to initiate the performance of actions by one or more computing services. It will be appreciated, however, that the functionality disclosed herein may be implemented in an innumerable number of other manners, utilizing other combinations of computing devices, computer systems and/ or software components, as will be apparent to those of ordinary skill having the benefit of the instant disclosure.

Therefore, the invention is not limited to the particular implementations discussed herein.

Now turning to FIG. 2, this figure depicts an example dependency graph data structure 200 consistent with some implementations. As discussed above, building conversations for implementation by an automated assistant can be problematic in many instances. Conversation models based on forms and slot filling, for example, have been found to produce poor conversation flow, e.g., conversation flows that are robotic or otherwise not realistic simulations of human interactions.

For some types of conversations, such as conversations associated with actions that access a computing service, modelling such conversations may be particularly problematic. Consider, as an example, a "book a table" conversation for making a restaurant reservation. A user is generally required to specify at least a number of people and a preferred time, and generally a computing service is called to obtain available dates and times from which the user can choose. The user may then be required to provide additional input such as contact information, and the computing service is called again to complete the reservation. In this process, various hardware elements of the client computing device, such as the speaker(s), microphone(s) and other user interface hardware, may be activated and deactivated as the user is prompted in various parts of the session, sometimes after a reasonable time delay, to provide information.

Form and slot filling models generally struggle to model these types of conversations, in part due to the fact that intermediate calls may need to be made prior to some user input, as well as the fact that some user input may be needed before such intermediate calls may be made. Such conversation flows are typical of many transactional use cases, such as the aforementioned reservation case, as well as various shopping, event ticket purchasing, and similar cases.

In the illustrated implementations, however, conversations are modelled with dependency graph data structures that define in part the dependencies between parameters and operations performed in the conversations. In some implementations, for example, a dependency graph data structure may be created based on an API of a computing service, and may be accessed during runtime to generate a conversation with a user that accesses the computing service.

A dependency graph data structure in some implementations may be based in part upon methods and dependencies therebetween. In such implementations, a specification may be defined for a conversation that defines one or more objects that may be produced by certain methods and that may be consumed by other methods as parameters.

A first type of method that may be defined in a specification is referred to herein as an action method, which generally specifies a fulfillment by a computing service. In the case of a third party computing service, for example, an action method may be associated with an agent that accesses the third party computing service, e.g., an HTTPAgent that includes a URL and one or more parameters to make an HTTP call. A field may also be provided in a specification of an action method in some implementations to specify whether a method is indexable, meaning that the method can be triggered by an agent to perform an action.

A second type of method that may be defined in a specification is referred to herein as an assistant method, which generally specifies how an automated assistant may obtain information from a user. An assistant method in some implementations may specify user input, e.g., text input, selection of a date, etc., and in some implementations an assistant method may be platform provided or provided by a third party.

Now with reference to FIG. 2, in the illustrated implementation, dependency graph data structure 200 is implemented as a directed acyclic graph (DAG) including a plurality of nodes 202-214 linked to one another through directed edges 216. Of note, FIG. 2 represents a simplified dependency graph data structure suitable for explanatory purposes, and not all relationships and parameters are represented in this figure for clarity.

It will be appreciated that a DAG is a type of graph in which edges have directions associated therewith (i.e., the edges are not bidirectional), as well as type of graph in which no directed cycles are defined (i.e., the edges do not form closed loops of nodes). In addition, in some implementations, and in contrast to a tree data structure, a DAG utilized in some implementations may support directed edges defining multiple parent and/or child relationships for any given node. It will be appreciated, however, that other data structures may be used in other implementations, so the invention is not limited specifically to a DAG.

Each node 202-214 identifies either an action method that accesses a computing service or an assistant method that collects one or more parameters. Moreover, each directed edge 216 connects a respective pair of nodes from among nodes 202-214 and effectively identifies at least one parameter generated, produced or otherwise output by one node in the pair and consumed, received, or otherwise utilized by the other node in the pair. To represent this directed relationship, each directed edge 216 is represented in FIG. 2 with an arrow pointing to the node in the pair that utilizes an associated parameter.

Dependency graph data structure 200 models the aforementioned "book a table" conversation, in this case for a hypothetical restaurant called "O'Briens," with each node 202-214 labeled with an associated action or assistant method and an object or parameter output by the associated method. For this conversation, four action methods are defined, and represented by blocks 202, 204, 208 and 210:

Reserve (block 202): makes a final reservation and produces a receipt object. In the illustrated implementation, this is the method that is indexed for a "book a table at O'Briens" use case.

SlotLock (block 204): locks an available time slot and produces a SlotLockID that is used by the Reserve action method.

SearchSlotsByPartySize (block 208): produces available time slots (represented by SearchSlotObjects) based upon a desired party size.

SearchSlots (block 210): produces available time slots (represented by SearchSlotObjects) based upon a desired party size and a preferred date and time.

Further, to model the conversation, three assistant methods are defined, and represented by blocks 206, 212 and 214:

SelectDateTime (block 206): prompts a user to select an available time slot returned by the SearchSlots action method.

GetPartySize (block 212): prompts a user to specify a desired party size and produces a PartySize object.

GetPreferredDateTime (block 214): prompts a user to specify a preferred data and time and produces a PreferredDateTime object.

It may be seen that directed edges 216 in FIG. 2 represent the parameters produced or output by the methods defined by certain nodes and consumed or utilized by other nodes. Thus, it should be apparent that the SearchSlotsByPartySize action method of node 208 uses as an input parameter the PartySize object produced by the GetPartySize method of node 212, while the SearchSlots action method of node 210 uses not only the PartySize object produced by the GetPartySize method of node 212 but also the PreferredDateTime object produced by the GetPreferredDateTime method of node 214. Likewise, the SelectDateTime method of node 206 may consume SearchSlotObjects produced by the methods of nodes 208 and 210, the SlotLock method of node 204 may consume a SelectedDateTime object produced by the SelectDateTime method of node 206, and the Reserve method of node 202 may consume the SlotLockID object produced by the SlotLock method of node 204.

As may be apparent from FIG. 2, a dependency graph data structure in some implementations may support multiple alternative assistant methods, as is the case with the methods of nodes 208 and 210, which search for available slots based upon different input parameters and provide similar outputs to node 206. Likewise, the method of a node may consume input parameters produced by multiple other nodes, as is the case with the method of node 210, which uses parameters output by each of nodes 212 and 214.

Figures 3G, 4:
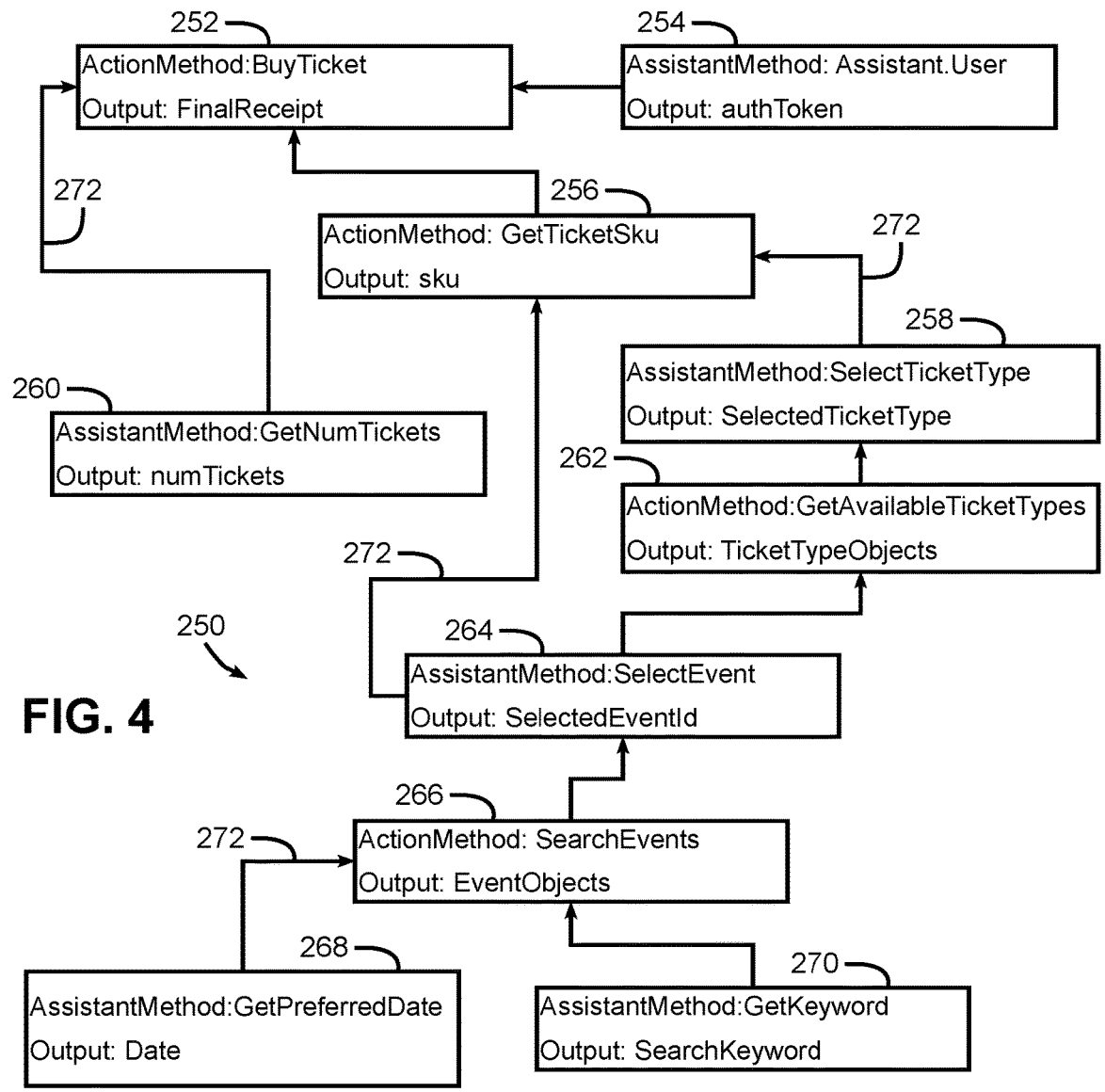

FIGS. 3A-3G illustrate at 220-232 specifications for the action methods and assistant methods defined by blocks 202-214 of FIG. 2. FIG. 3A, for example, illustrates at 220 an example specification for the Reserve action method. The specification indicates, for example, that the method is indexable, and is thus callable to perform the intended action for the conversation. The specification defines an HTTP agent to make a call to a hypothetical third party computing service hosted at api.exampleagent.com, and specifies a number of parameters used by the call, as well as the source of each parameter. Of note, not all parameters used by the call are illustrated in FIG. 3A for the sake of simplifying the illustration.

As is also apparent from FIG. 3A, in some implementations, parameters may be provided not only by soliciting user input (e.g., user input provided with an initial natural language input or user input provided in the course of the conversation in response to a prompt generated by an assistant method), but also based upon stored user data that is not explicitly solicited from or provided by a user in connection with the conversation. One parameter illustrated in FIG. 3A, for example, is a "firstname" parameter that in some implementations may be provided by a user profile maintained for a user, since in many instances contact information for a user may be accessible by an automated assistant interacting with the user.

FIGS. 3B-3D likewise illustrate at 222-226 specifications for the SlotLock, SearchSlots and SearchSlotsByPartySize action methods, and each includes a reference to an HTTP agent to make a call to the hypothetical third party computing service. Each of these methods, however, generates intermediate data for use in performing the reservation action, so none of these methods is marked as indexable.

FIGS. 3E-3G illustrate at 228-232 specifications for the SelectDateTime, GetPartySize, and GetPreferredDateTime assistant methods. Each specification may also in some implementations include desired user input, as well as text or other data for use in generating a prompt to a user to provide the desired user input. While text for a prompt may be specified in some implementations, in other implementations, other manners of representing a natural language output, e.g., grammars, may be defined for an assistant method, and in other implementations, prompts may be determined based upon the desired user input without any specific definition in the specification for that method.

FIG. 4 and FIGS. 5A-5I illustrate another example use case, that of a conversation for purchasing a ticket to an event. FIG. 4, in particular, illustrates an example dependency graph data structure 250 including nodes 252-270 and directed edges 272. Dependency graph data structure 250 is also used to perform an action with the same third party computing service used in the example use case of FIGS. 2 and 3A-3G, which is accessible at api.exampleagent.com.

Nodes 252, 256, 262 and 266 define action methods that invoke calls to the third party computing service:

BuyTicket (block 252): purchases a ticket based upon a user's authorized token, a SKU of the ticket to be purchased, and an input of a number of tickets to purchase. A specification of this action method is illustrated at 280 in FIG. 5A. The specification indicates, for example, that the method is indexable, and is thus callable to perform the intended action for the conversation.

GetTicketSku (block 256): obtains a SKU for a ticket based upon an event ID and a specified ticket type. A specification of this action method is illustrated at 282 in FIG. 5B.

GetAvailableTicketTypes (block 262): obtains the ticket types available for a given event ID. A specification of this action method is illustrated at 284 in FIG. 5C.

SearchEvents (block 266): searches for available events on a certain date and matching a desired keyword (or set of keywords). A specification of this action method is illustrated at 286 in FIG. 5D.

Nodes 254, 258, 260, 264, 268 and 270 define assistant methods that collect information usable in performing the action:

AssistantUser (block 254): obtains from stored user data an authorization token for the user. This assistant method merely accesses stored data for the user, and as such no specification of this method is illustrated.

SelectTicketType (block 258): prompts a user to select a ticket type among those retrieved by the GetAvailableTicketTypes action method and produces a SelectedTicketType object. A specification of this assistant method is illustrated at 288 in FIG. 5E.

GetNumTickets (block 260): prompts a user to specify a desired number of tickets and produces a NumTickets object. A specification of this assistant method is illustrated at 290 in FIG. 5F.

SelectEvent (block 264): prompts a user to select an event among those retrieved by the SearchEvents action method and produces a SelectedEventId object. A specification of this assistant method is illustrated at 292 in FIG. 5G.

GetPreferredDate (block 268): prompts a user to specify a preferred date and produces a Date object for use in searching for events. A specification of this assistant method is illustrated at 294 in FIG. 5H.

GetKeyword (block 270): prompts a user to specify one or more keywords for use in searching for events and produces a SearchKeyword object. A specification of this assistant method is illustrated at 296 in FIG. 5I.

In the aforementioned examples, all of the illustrated parameters are mandatory. In other implementations, however, parameters may be designated as optional, and may be supplied to a computing service when provided by a user or otherwise available, but otherwise omitted if not determined during a dialog session.

Figure 6:
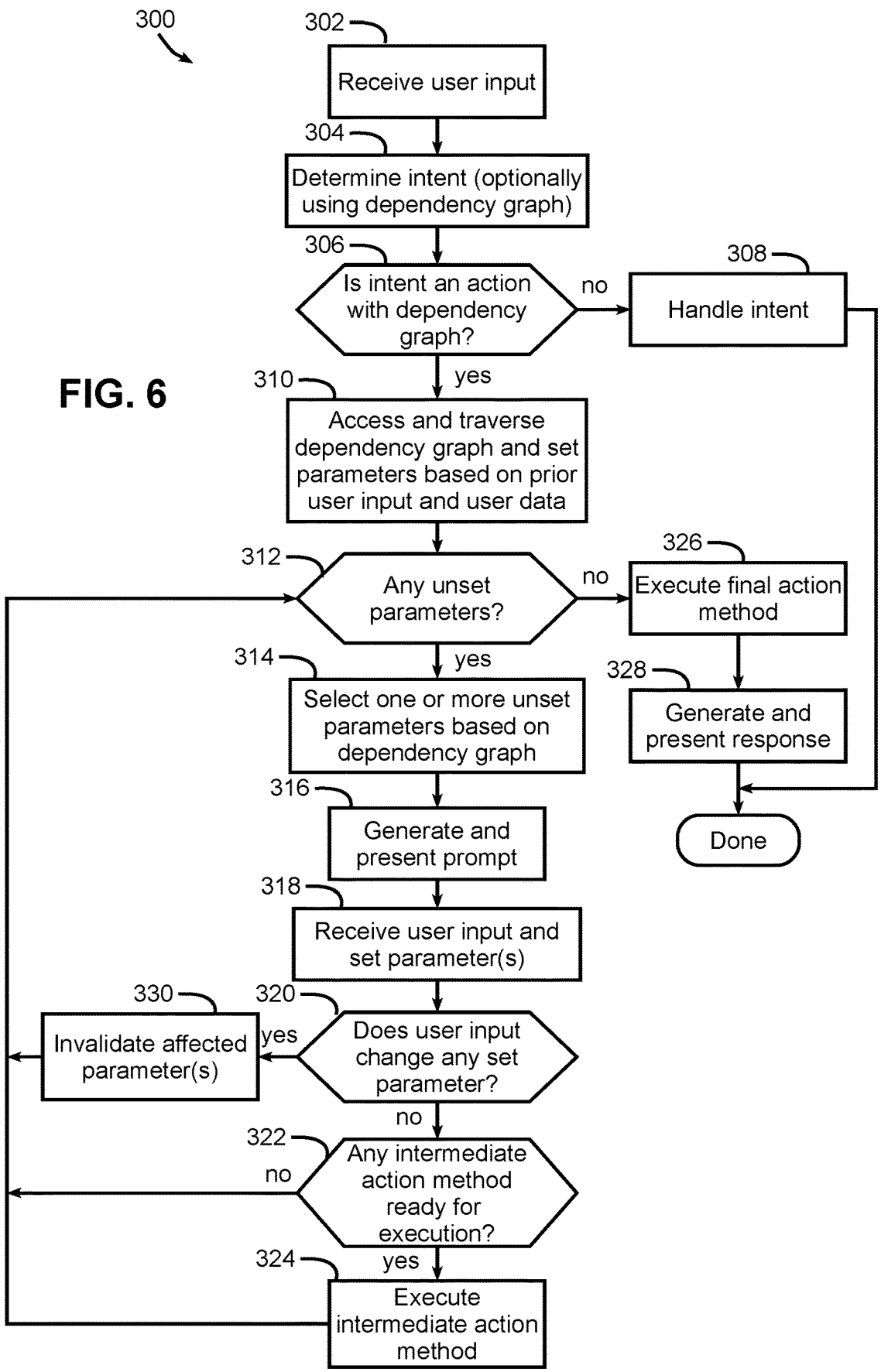
FIG. 6 is a flowchart illustrating an example sequence of operations for conducting a human-to-computer dialog session using a dependency graph data structure, in accordance with various implementations.

Now turning to FIG. 6, an example sequence of operations 300 for conducting a human-to-computer dialog session using a dependency graph data structure is illustrated. Sequence 300 may be implemented, for example, using one or more processors and using one or more of the various components illustrated in FIG. 1, e.g., under the control of dialog engine 138 and utilizing other automated assistant components 119. In block 302, for example, user input associated with an intent may be initially received, and in block 304, the intent may be determined, e.g., by intent matcher 136 of FIG. 1. In block 306, a determination may be made as to whether the intent is associated with an action for which a dependency graph data structure is associated, e.g., one of various use cases for which conversations have been modeled via dependency graph data structures. If not, control may pass to block 308 to handle the intent in a conventional manner.

Moreover, as also noted in block 304, in some implementations a dependency graph data structure may also be used to determine an intent. For example, it may be desirable in some implementations to model multiple types of actions in the same dependency graph, thereby enabling traversal of the dependency graph to be used to select from among multiple actions. As an example, where multiple actions are supported using similar types of input parameters, selection of an action from among multiple modeled actions may be based in part on the available parameters specified by a user in the initial input.

Returning to block 306, if the intent is determined to be associated with an action for which a dependency graph data structure exists for modeling a conversation, control may pass from block 306 to block 310 to access and traverse the dependency graph data structure and optionally set one or more parameters based upon prior user input and/or stored user data. For example, if an initial input from a user includes text that defines one or more parameters used by an action when requesting the action, there is generally no need to prompt a user for those parameters. Thus, if a user inputs "please book a table for four at O'Briens" the desired party size is known, so there is no need to ask the user to provide that data. Also, where a dependency graph data structure models a reservation conversation for multiple restaurants, the restaurant "O'Briens" would already be known from the initial input. This may feed into the effects discussed above, resulting in more efficient overall usage of aspects of the hardware at the client computing device.

Likewise, where one or more parameters used by an action are available as stored data (e.g., from a user profile), it may also not be necessary to prompt the user for that data, or alternatively, to provide that data for the purposes of confirmation (e.g., "Would you like me to use your mobile number XXX-XXX-XXXX as your contact number?").

Next, in block 312 a determination is made as to whether any parameters needed to perform the action are unset, i.e., remain to be determined. A parameter may be unset, for example, if the user still needs to be prompted to provide that parameter. In addition, a parameter may be unset if an action method needs to be executed in order to generate some intermediate data that is needed prior to obtaining that parameter, e.g., a list of available time slots for booking a table from which the user may then select.

If any parameters remain unset, control passes to block 314 to select one or more unset parameters based upon the dependency graph data structure. In some implementations, for example, the order in which parameters are selected may be determined at least in part using the dependency graph data structure, e.g., by prioritizing parameters that are consumed by action methods that generate intermediate data that is later used as a parameter for another method.

In block 316, a prompt for the selected one or more parameters is generated and presented to the user, e.g., by executing one or more assistant methods associated with the selected parameters, and then in block 318 user input to the prompt is received and any parameters specified in the input are set. It will be appreciated that in some implementations, the generated prompts and responses in a dialog session may be in the form of natural language outputs that are presented in visual and/or audio form, while the user input may include instances of free-form natural language input received by one or more input components of a computing device (e.g., touchscreens, keyboards, microphones, etc.), although the invention is not so limited.

In block 320, it is determined whether the user input changes any parameter that has already been set, and if not, control passes to block 322, where a determination is made as to whether any intermediate action method is ready for execution (i.e., where all parameters for that action are set). If so, control passes to block 324 to execute the intermediate action method and return control to block 312 to continue the dialog session to determine any remaining unset parameters. If not, block 324 is bypassed and block 322 returns control directly to block 312. Then, once all parameters have been set, block 312 passes control to block 326 to execute the final action method, e.g., by executing a call operation to the computing service using the parameters determined during the dialog session as inputs to the call operation. A response is then generated and presented to a user in block 328 to report the outcome of the action, and the dialog session is complete.

Returning to block 320, as noted above, in some instances a user input in a dialog session may include a change to a parameter that has already been set. Thus, in such circumstances, control may be diverted to block 330 to invalidate one or more affected parameters. By doing so, subsequent operations in sequence 300 may re-execute one or more action or assistant methods to update any invalidated parameters. Of note, when one or more parameters is invalidated, one or more other parameters that are not affected by the change may be maintained as valid, and as a result re-execution of one or more action methods or assistant methods used to determine the unaffected parameters may be effectively bypassed when re-executing the one or more action methods or assistant methods associated with the invalidated parameters.

Figure 7:
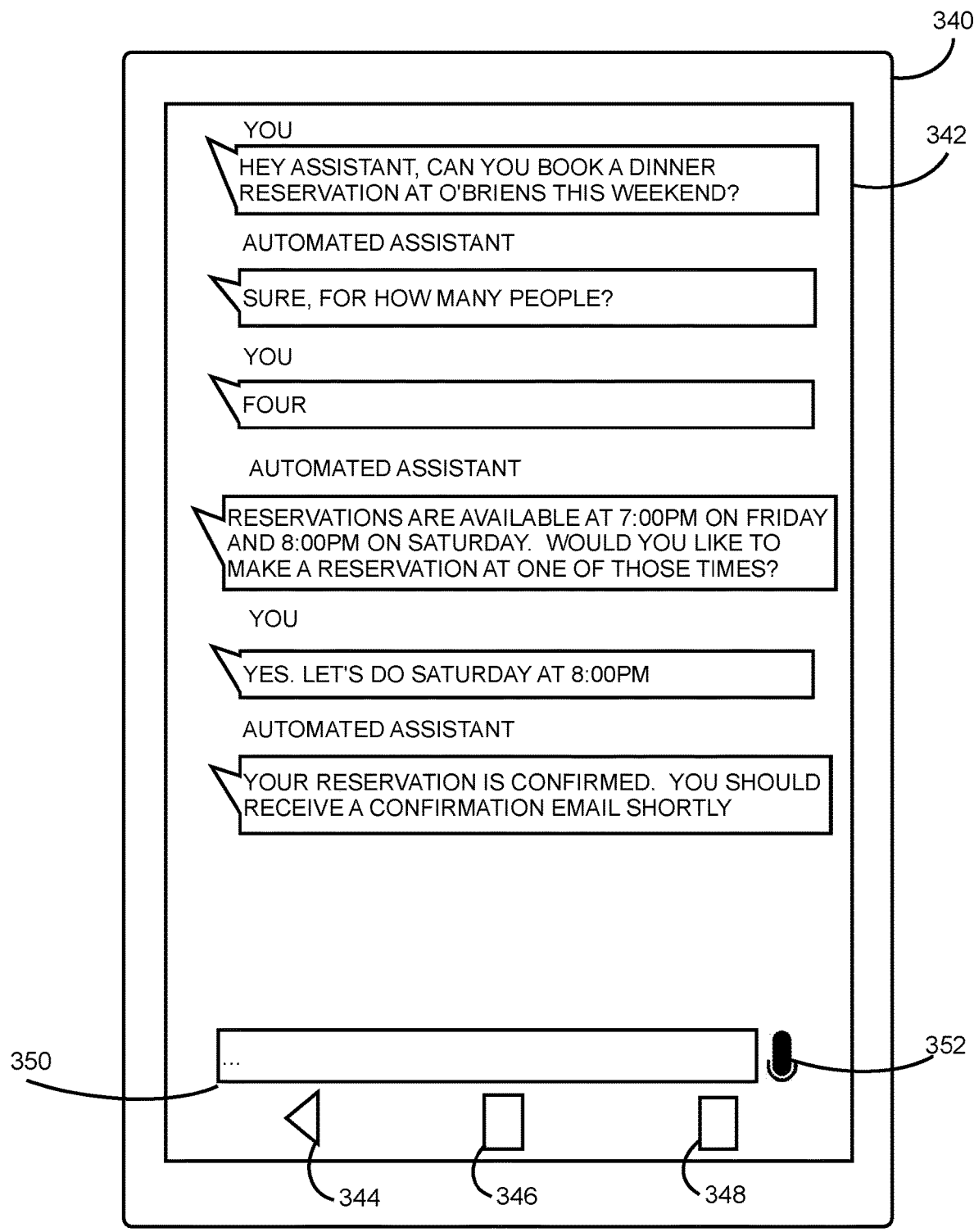
FIG. 7 depicts an example restaurant reservation booking dialog between a user and an automated assistant using a computing device of the user, in accordance with various implementations.

Now turning to FIG. 7, this figure illustrates an example dialog session between a user and an automated assistant 120 implemented at least in part on a computing device 340 operated by the user and including a touchscreen 342, various user interface buttons 344, 346, 348, a text input field 350, and a microphone icon 352. Microphone icon 352 may be operable to enable the user to provide voice input, which may be speech recognized, e.g., by speech capture/TTS/STT module 114, and used, for instance, to populate text input field 350.

In this dialog session, the user operating client device 340 ("You") provides the following free-form natural language input (e.g., using input field 350): "HEY ASSISTANT, CAN YOU BOOK A DINNER RESERVATION AT O'BRIENS THIS WEEKEND?." In some implementations, an automated assistant, e.g., using intent matcher 136, may determine that this input is associated with an action to book at table at O'Briens, and that this action has an associated dependency graph data structure (e.g., as discussed above in connection with blocks 304-306 of FIG. 6). The dependency graph data structure for this example may be similar to dependency graph data structure 200 discussed above in connection with FIGS. 2 and 3A-3G.

Moreover, by accessing and traversing the dependency graph data structure as discussed above in connection with block 310 of FIG. 6, it may be determined that input data has been provided relating to the PreferredDateTime parameter ("dinner" and "this weekend"), but no input data has been provided relating to the PartySize parameter, and that the SearchSlots action method cannot be executed without both parameters. As such, a prompt such as "SURE, FOR HOW MANY PEOPLE?" may be generated and presented to the user as discussed above in connection with blocks 314 and 316 of FIG. 6. The efficiency of this process and relevancy of the prompt generated enables efficient use of hardware resources at the client computing device, as previously discussed.

The user may then respond with a number such as "FOUR", which is then used to set the PartySize Parameter. Then, it may be determined that sufficient data exists to execute the SearchSlots action method to generate intermediate data (here, available time slots), and the SearchSlots action method may be executed, e.g., as discussed above in connection with blocks 322-324 of FIG. 6. It should be noted that either the SearchSlots action method itself, or the automated assistant, may be configured to determine appropriate inputs for the SearchSlots call to the computing service. For example, assuming the user input of "dinner" and "this weekend," a time range such as 5:00 pm to 10:00 pm and a date range including the next Friday, Saturday and Sunday may be used. In some instances, multiple calls to the computing service may be made, e.g., one for each day in the date range.

Once available time slots are returned from the computing service, one or more of the available time slots may be presented to the user with a prompt to select a time slot to reserve ("RESERVATIONS ARE AVAILABLE AT 7:00 PM ON FRIDAY AND 8:00 PM ON SATURDAY. WOULD YOU LIKE TO MAKE A RESERVATION AT ONE OF THOSE TIMES?"). In some instances, a list of all available time slots may be presented, or alternatively, as illustrated in FIG. 7, only one or more preferred time slots (e.g., time slots selected based upon user history, restaurant history, etc.) may be presented.

Then, based on a user response selecting a time slot ("YES. LET'S DO SATURDAY AT 8:00 PM") the automated assistant may determine that the parameters necessary to execute the SlotLock action method are now set, thereby executing the SlotLock action method to lock to the slot, which then provides all necessary parameters for the Reserve action method. Execution of the Reserve action method may result in the return of a ReceiptObject, which may then be processed by the automated assistant to output a confirmatory response ("YOUR RESERVATION IS CONFIRMED. YOU SHOULD RECEIVE A CONFIRMATION EMAIL SHORTLY").

Figure 8:
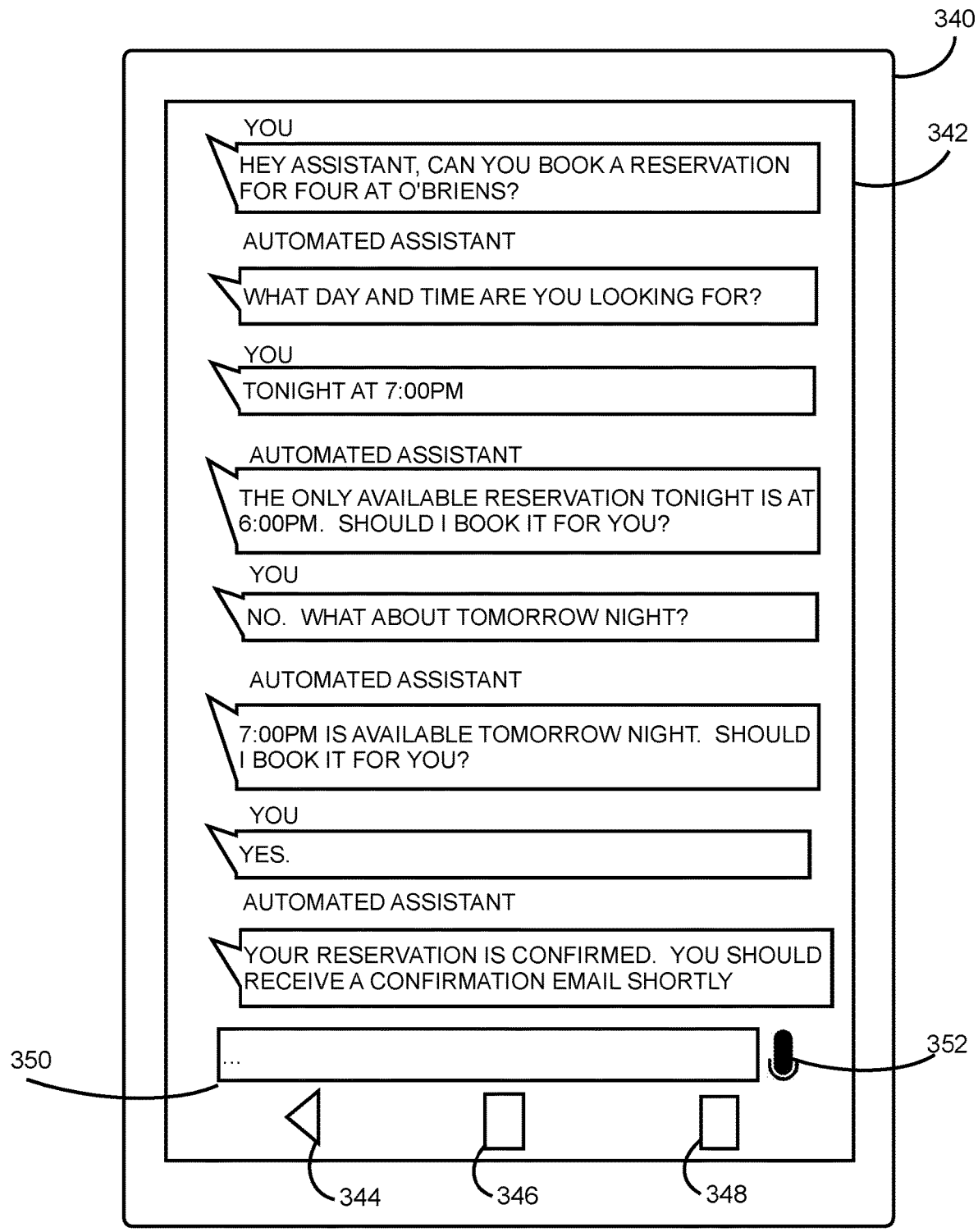
FIG. 8 depicts another example restaurant reservation booking dialog between a user and an automated assistant using a computing device of the user, in accordance with various implementations.

FIG. 8 illustrates another example dialog session with a user of computing device 340, which begins with an initial input of "HEY ASSISTANT, CAN YOU BOOK A RESERVATION FOR FOUR AT O'BRIENS?" Traversal of the dependency graph may determine that the PartySize parameter is not set, thereby resulting in a prompt of "WHAT DAY AND TIME ARE YOU LOOKING FOR?" In response to a user input of "TONIGHT AT 7:00 PM," the automated assistant may execute the SearchSlots action method to call the computing service using a party size of four and a preferred date and time of the current day and 7:00 PM.

Assuming that the response of the call to the computing service only returns an available time slot of 6:00 PM, a response such as "THE ONLY AVAILABLE RESERVATION TONIGHT IS AT 6:00 PM. SHOULD I BOOK IT FOR YOU?" may be returned. Also assuming that this time is unacceptable to the user, the user may response with an input such as "NO. WHAT ABOUT TOMORROW NIGHT?," which may be detected by the automated assistant as changing the PreferredDateTime parameter, resulting in this parameter, as well as the SearchSlotsObject previously generated by the SearchSlots action method being invalidated and the SearchSlots action method being re-executed to generate a new set of available time slots (e.g., as discussed above in connection with blocks 320 and 330 of FIG. 6). The automated assistant may then generate a new prompt such as "7:00 PM IS AVAILABLE TOMORROW NIGHT. SHOULD I BOOK IT FOR YOU?" and assuming this time slot is acceptable to the user, the booking may then be completed in a similar manner to that described above in connection with FIG. 7.

Figure 9:
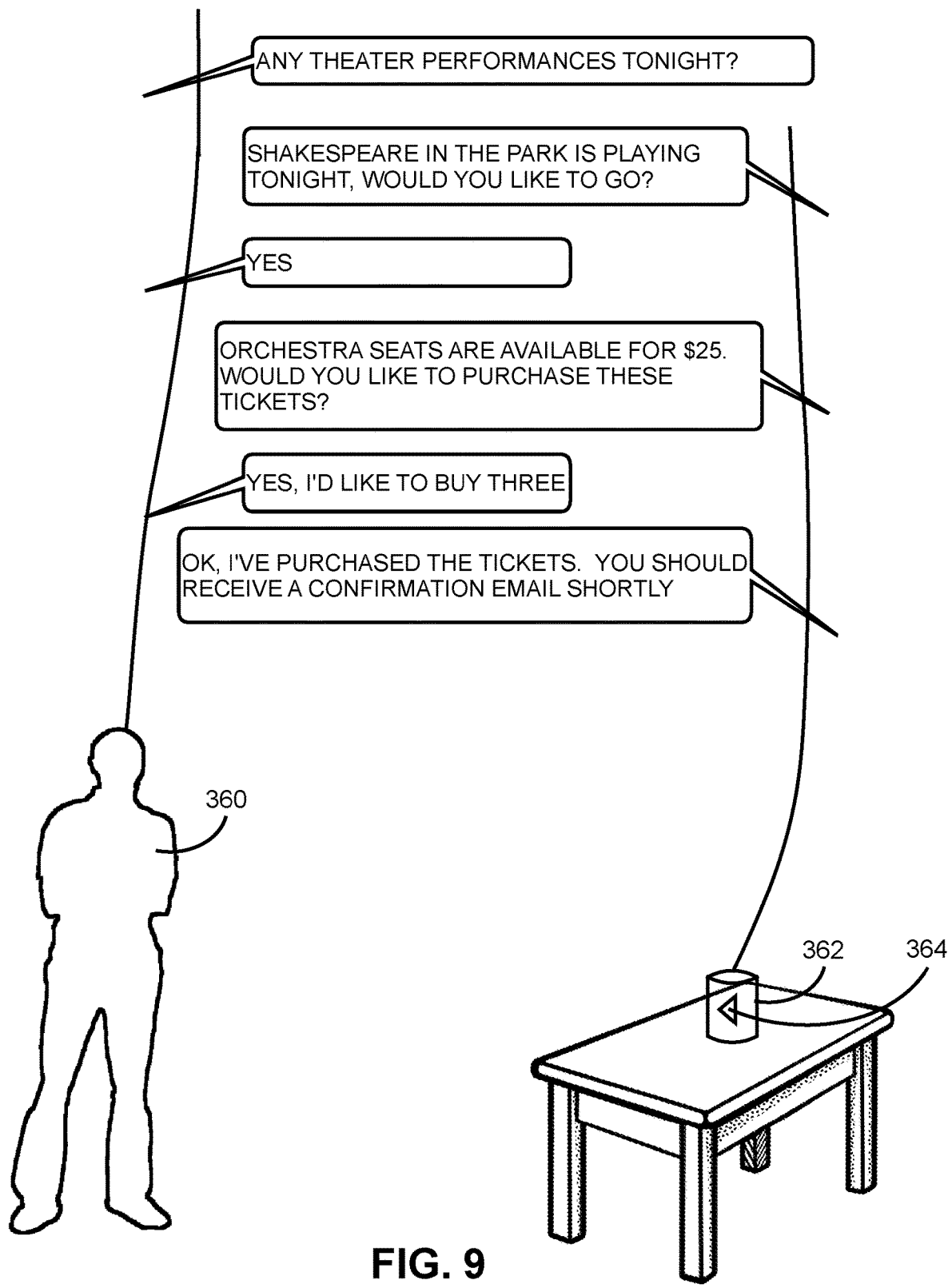
FIG. 9 depicts an example event ticket purchasing dialog between a user and an automated assistant using a stand-alone interactive speaker, in accordance with various implementations.

FIG. 9 next depicts an example dialog session between a user 360 and automated assistant 120 by way of a standalone interactive speaker 362 operated by the user 360, in accordance with various implementations. In this dialog session, an initial input of "ANY THEATER PERFORMANCES TONIGHT?" may result in an intent determination of an action that is associated with dependency graph data structure 250 of FIGS. 4 and 5A-5I.

Initial analysis of the dependency graph data structure may determine values for both the SearchKeyword parameter ("theater") and Date parameter ("tonight"), and thus the SearchEvents action method may be executed prior to prompting the user for any additional parameters. Consequently, the automated assistant may execute the SelectEvent assistant method to output one or more possible events to the user ("SHAKESPEARE IN THE PARK IS PLAYING TONIGHT, WOULD YOU LIKE TO GO?"), and assuming the user responds in the affirmative, the automated assistant may execute the GetAvailableTicketTypes action method to determine one or more TicketTypeObjects (which may include, for example, both location and pricing information, e.g., "ORCHESTRA SEATS ARE AVAILABLE FOR $25. WOULD YOU LIKE TO PURCHASE THESE TICKETS?"). Assume also that the user responds "YES, I'D LIKE TO BUY THREE," the GetTicketSku action method may be executed to determine a SKU for the selected ticket. Moreover, because the user input specifies a number of tickets, the automated assistant may bypass execution of the GetNumTickets assistant method, and the BuyTicket action method may be executed to call the computing service using inputs of the ticket SKU and the number of tickets, as well as authentication information provided by the automated assistant, and a response such as "OK, I'VE PURCHASED THE TICKETS. YOU SHOULD RECEIVE A CONFIRMATION EMAIL SHORTLY" may be generated and presented to the user.

Figure 10:
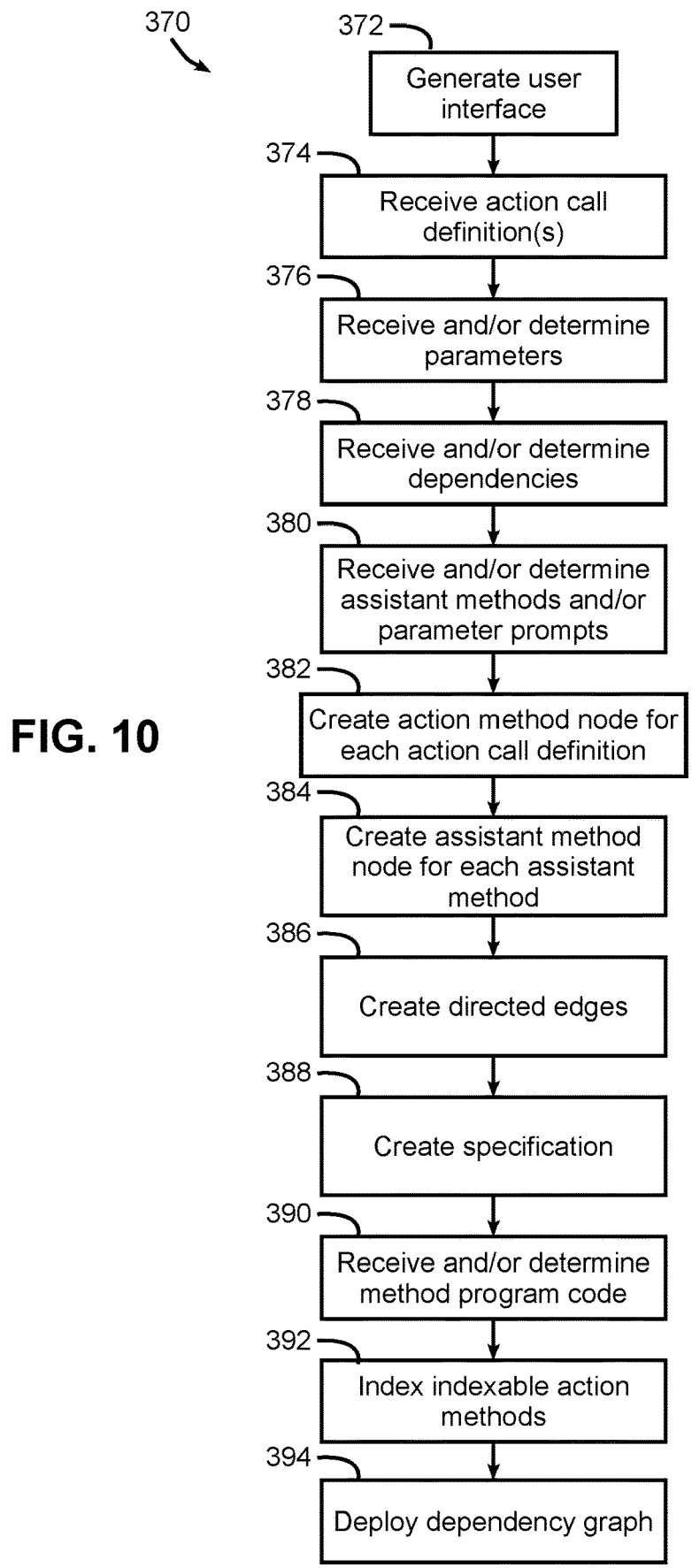
FIG. 10 is a flowchart illustrating an example sequence of operations for generating and deploying a dependency graph data structure, in accordance with various implementations.

A dependency graph data structure may be generated in a number of manners in different implementations, and using a number of different graphical, visual and/or textual programming interfaces. FIG. 10, for example, illustrates on example sequence of operations 370 for generating a dependency graph data structure. In block 372, for example, a computer system may generate a programming user interface and present that interface to a user (e.g., a developer). The computer system may then receive one or more action call definitions in block 374, corresponding, for example, to a third party agent API. Then, in block 376, one or more parameters may be received and/or determined. Received parameters, for example, may be supplied manually by the user, while determined parameters may be derived, for example, from analysis of the action call definitions.

Next, in block 378, dependencies may be received and/or determined. Dependencies may be received, for example, based upon user input linking the outputs of some action calls to the inputs of other action calls, while dependencies may be determined based upon programmatic analysis of the inputs and outputs of those action calls. Then, in block 380, one or more assistant methods and/or parameter prompts may be received and/or determined. For example, a user may manually input prompts for particular parameters or draft program code for various assistant methods. As another example, the computer system may determine what parameters require user input and may derive assistant methods, assistant method templates and/or prompts for collecting that user input.

Next, in block 382, the computer system creates an action method node for each action call definition, and in block 384, the computer system creates an assistant method node for each assistant method. Then, in block 386, directed edges are created to link together the various nodes according to the determined dependencies. In addition, in some implementations, and as shown in blocks 388 and 390, a specification similar to those illustrated in FIGS. 3A-3G and 5A-5I may be generated and program code for each method may be determined, e.g., using automated code generation, or alternatively, a specification may be drafted manually by a user, or by some combination of both approaches.

The computer system may then index all action methods identified as indexable in the specification in block 392, thereby registering the action methods with the automated assistant. Then in block 394, the dependency graph data structure may be deployed and made available for use by the automated assistant.

It will be appreciated that a wide variety of programming models, languages, and interfaces, including different levels of automated code generation and manual input from a user, may be used in various implementations, so the invention is not limited to the particular implementations discussed herein. For example, in some implementations, automation may be used to generate or suggest data types, dependencies, authorization or authentication methods, etc., and may, in some instances, perform verification of a dependency graph data structure, e.g., to confirm that each parameter used by each method has a corresponding directed edge from another method that outputs that parameter. In addition, in some implementations, methods and/or portions of dependency graph data structures may be stored and/or reused for other dependency graph data structures, e.g., as may be provided by a third party computing service provider, by an assistant provider, via a community repository, etc.

The aforementioned use of a dependency graph data structure provides a number of technical benefits in different implementations. For example, as compared to some low level APIs or form filling approaches, more realistic and less robotic conversations may be supported, and an automated assistant may have greater flexibility in deciding the order in which parameters may be requested and what action methods may be executed. Moreover, machine learning techniques may be used by an automated assistant to optimize the use of a dependency graph data structure to provide more realistic conversations, as well as conversations that are better adapted to particular users. The approach may also be adaptable to multiple use cases and may be extendible to additional use cases with little or no additional programming. Furthermore, the need for a developer to anticipate all possible inputs and combinations of input parameters may be avoided.

Furthermore, in some implementations, computing resources may be conserved through the ability to dynamically invalidate parameters while maintaining other parameters valid, thereby avoiding the need to restart a conversation.

Figure 11:
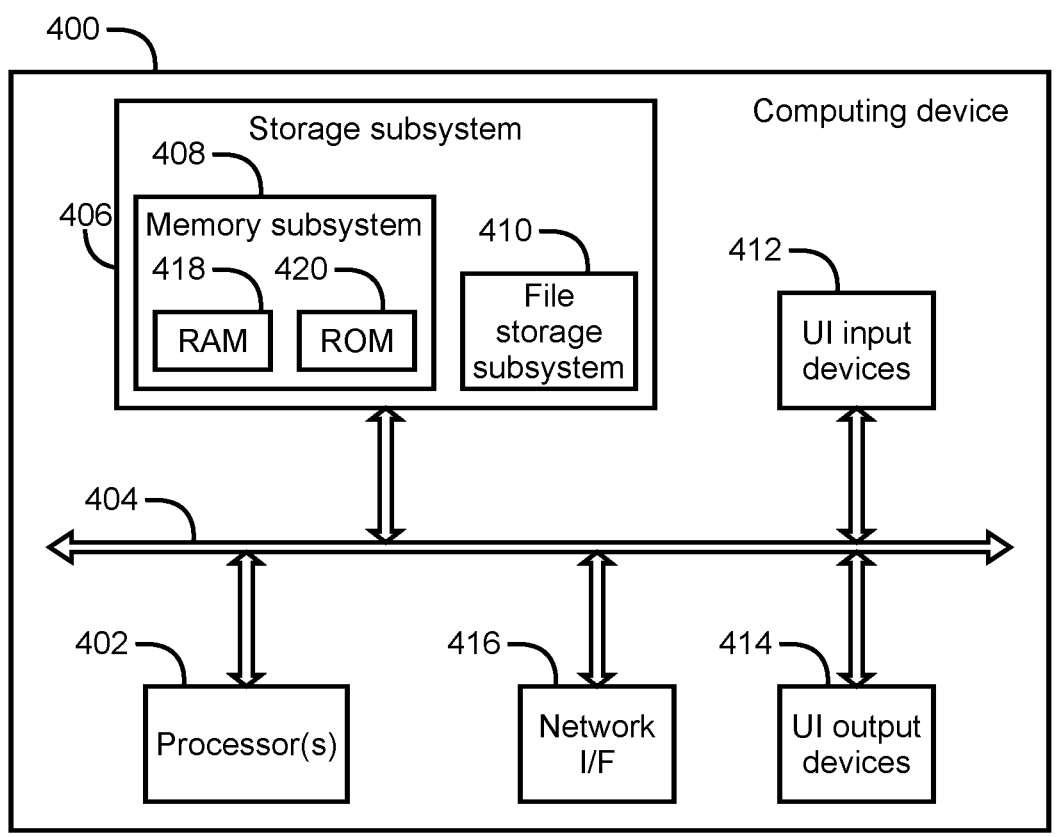
FIG. 11 illustrates an example architecture of a computing device.

FIG. 11 is a block diagram of an example computing device 400. Computing device 400 typically includes at least one processor 402 that communicates with a number of peripheral devices via bus subsystem 404. These peripheral devices may include a storage subsystem 406, including, for example, a memory subsystem 408 and a file storage subsystem 410, user interface input devices 412, user interface output devices 414, and a network interface subsystem 416. The input and output devices allow user interaction with computing device 400. Network interface subsystem 416 provides an interface to outside networks and is coupled to corresponding interface devices in other computing devices.

User interface input devices 412 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 400 or onto a communication network.

User interface output devices 414 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 400 to the user or to another machine or computing device.

Storage subsystem 406 stores programming and data constructs that provide the functionality of some or all of the modules described herein. For example, the storage subsystem 406 may include the logic to perform selected aspects of the sequence of FIG. 6 and/or the sequence of FIG. 10.

These software modules are generally executed by processor 402 alone or in combination with other processors. Memory 408 used in the storage subsystem 406 can include a number of memories including a main random access memory (RAM) 418 for storage of instructions and data during program execution and a read only memory (ROM) 420 in which fixed instructions are stored. A file storage subsystem 410 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 410 in the storage subsystem 406, or in other machines accessible by the processor(s) 402.

Bus subsystem 404 provides a mechanism for enabling the various components and subsystems of computing device 400 to communicate with each other as intended. Although bus subsystem 404 is shown schematically as a single bus, alternative implementations of the bus subsystem may use multiple busses.

Computing device 400 can be of varying types including a mobile device, a smartphone, a tablet, a laptop computer, a desktop computer, a wearable computer, a programmable electronic device, a set top box, a workstation, a server, a computing cluster, a blade server, a server farm, or any other data processing system or computing device. Due to the ever-changing nature of computers and networks, the description of computing device 400 depicted in FIG. 11 is intended only as a specific example for purposes of illustrating some implementations. Many other configurations of computing device 400 are possible having more or fewer components than computing device 400 depicted in FIG. 11.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   determining an action to be performed by a computing service for a user of a computing device in communication with an automated assistant implemented at least in part by the one or more processors; and
   with the automated assistant, causing the computing service to perform the action for the user of the computing device by:
   accessing a dependency graph data structure for the action, the dependency graph data structure including a plurality of nodes and a plurality of directed edges, each node identifying an action method that accesses the computing service or an assistant method that collects one or more parameters for use in performing the action, and each directed edge connecting a respective pair of nodes from among the plurality of nodes and identifying at least one parameter generated by the action method or assistant method identified by one node among the respective pair of nodes and utilized by the action method or assistant method identified by the other node among the respective pair of nodes;

conducting a human-to-computer dialog session between the user and the automated assistant to determine one or more parameters used to perform the action, including generating one or more natural language outputs for presentation by the computing device operated by the user using the dependency graph data structure and receiving one or more instances of free-form natural language input that are received at one or more input components of the computing device operated by the user; and initiating performance of the action by the computing service using the determined one or more parameters.

2. The method of claim 1, wherein a first node among the plurality of nodes in the dependency graph data structure identifies a first action method that calls the computing service, and wherein initiating performance of the action by the computing service includes executing the first action method.

3. The method of claim 2, wherein the first action method includes a call operation including a plurality of inputs, and wherein executing the first action method includes executing the call operation using the determined one or more parameters as inputs among the plurality of inputs for the call operation.

4. The method of claim 2, wherein the dependency graph data structure includes a specification that defines methods and dependencies therebetween, and wherein the first action method is marked as indexable in the specification to indicate that the first action method calls the computing service to perform the action.

5. The method of claim 2, wherein the first action method calls the computing service to perform the action, and wherein a second node among the plurality of nodes in the dependency graph data structure identifies a second action method that calls the computing service to obtain intermediate data for use in performing the action.

6. The method of claim 1, wherein a first node among the plurality of nodes in the dependency graph data structure identifies a first assistant method that includes a first prompt that requests a first parameter, and wherein generating the one or more natural language outputs includes executing the first assistant method to generate a first natural language output including the first prompt.

7. The method of claim 1, wherein determining the action to be performed by the computing service is performed by the automated assistant and is based upon an initial natural language input received at the computing device of the user and specifying a first parameter identified by a first directed edge in the dependency graph data structure, wherein the first directed edge connects a first node that identifies a first assistant method that generates the first parameter and a second node that identifies a first action method that utilizes the first parameter, and wherein conducting the human-to-computer dialog session between the user and the automated assistant includes bypassing generation of a natural language output to request the first parameter in response to determining that the first parameter is specified in the initial natural language input.

8. The method of claim 1, wherein a first parameter identified by a first directed edge in the dependency graph data structure connects a first node that identifies a first assistant method that generates the first parameter and a second node that identifies a first action method that utilizes the first parameter, and wherein conducting the human-to-computer dialog session between the user and the automated assistant includes bypassing generation of a natural language output to request the first parameter in response to determining that the first parameter is determinable without requesting the first parameter from the user.

9. The method of claim 1, wherein conducting the human-to-computer dialog session between the user and the automated assistant to determine the one or more parameters used to perform the action includes ordering the one or more generated natural language outputs using the dependency graph data structure.

10. The method of claim 1, further comprising:
invalidating one or more of the determined one or more parameters during the human-to-computer dialog session in response to receiving a first instance of free-form natural language input among the one or more instances of free-form natural language input;
accessing the dependency graph data structure to identify one or more action methods or assistant methods identified in the dependency graph data structure to re-execute in order to update the one or more invalidated parameters; and
re-executing the one or more identified action methods or assistant methods to update the one or more invalidated parameters.

11. The method of claim 10, wherein invalidating the one or more parameters maintains one or more other parameters as valid such that re-execution of one or more action methods or assistant methods used to determine the one or more other parameters is bypassed when re-executing the one or more identified action methods or assistant methods.

12. The method of claim 1, wherein determining the action is performed by the automated assistant and includes selecting the action from among a plurality of actions using the dependency graph data structure.

13. The method of claim 1, wherein the computing service is a third party computing service, and wherein initiating performance of the action by the computing service using the determined one or more parameters includes calling the third party computing service using the determined one or more parameters.

14. The method of claim 1, wherein the computing service is a cloud computing service or is resident on the computing device operated by the user.

15. The method of claim 1, wherein the dependency graph data structure defines a directed acyclic graph.

16. The method of claim 1, wherein the action creates a reservation, wherein a first node among the plurality of nodes identifies a first action method that calls the computing service to search for available time slots, and wherein a second node among the plurality of nodes identifies a second action method that calls the computing service to reserve an available time slot.

17. The method of claim 1, wherein the action obtains a product or a ticket to an event.

18. A method implemented using one or more processors, comprising:

receiving through a computer interface a plurality of parameters to be used by an automated assistant to cause a computing service to perform an action for a user of a computing device in communication with the automated assistant;

determining a plurality of dependencies between the plurality of parameters;

building a dependency graph data structure for the action using the one or more processors, the dependency graph data structure configured for use in conducting a human-to-computer dialog session between the user and the automated assistant to determine one or more parameters used to perform the action, including for generating one or more natural language outputs for presentation by the computing device operated by the user, wherein building the dependency graph data structure for the action includes:

building a plurality of nodes for the dependency graph data structure using the received plurality of parameters, including building at least one node identifying an action method that accesses the computing service and building at least one assistant method that collects one or more parameters from among the received plurality of parameters; and building a plurality of directed edges for the dependency graph data structure using the determined plurality of dependencies, each directed edge connecting a respective pair of nodes from among the plurality of nodes and identifying at least one parameter from among the received plurality of parameters that is generated by the action method or assistant method identified by one node among the respective pair of nodes and utilized by the action method or assistant method identified by the other node among the respective pair of nodes; and generating a call operation in the action method that calls the computing service with one or more of the received plurality of parameters to perform the action.

19. The method of claim 18, wherein determining the plurality of dependencies includes receiving the plurality of dependencies through the computer interface.

20. The method of claim 18, wherein receiving the plurality of parameters includes receiving a plurality of action call definitions.

21. A system comprising one or more processors and memory operably coupled with the one or more processors, wherein the memory stores instructions that, in response to execution of the instructions by one or more processors, cause the one or more processors to perform a method comprising:

determining an action to be performed by a computing service for a user of a computing device in communication with an automated assistant implemented at least in part by the one or more processors; and with the automated assistant, causing the computing service to perform the action for the user of the computing device by:

accessing a dependency graph data structure for the action, the dependency graph data structure including a plurality of nodes and a plurality of directed edges, each node identifying an action method that accesses the computing service or an assistant method that collects one or more parameters for use in performing the action, and each directed edge connecting a respective pair of nodes from among the plurality of nodes and identifying at least one parameter generated by the action method or assistant method identified by one node among the respective pair of nodes and utilized by the action method or assistant method identified by the other node among the respective pair of nodes;

conducting a human-to-computer dialog session between the user and the automated assistant to determine one or more parameters used to perform the action, including generating one or more natural language outputs for presentation by the computing device operated by the user using the dependency graph data structure and receiving one or more instances of free-form natural language input that are received at one or more input components of the computing device operated by the user; and initiating performance of the action by the computing service using the determined one or more parameters.

* * * * *